Sept. 17, 1935.                 B. J. THEMAR                    2,014,485
                     ANGLE INDICATOR FOR CORNICE BRAKES
                       Filed July 6, 1934      2 Sheets-Sheet 1
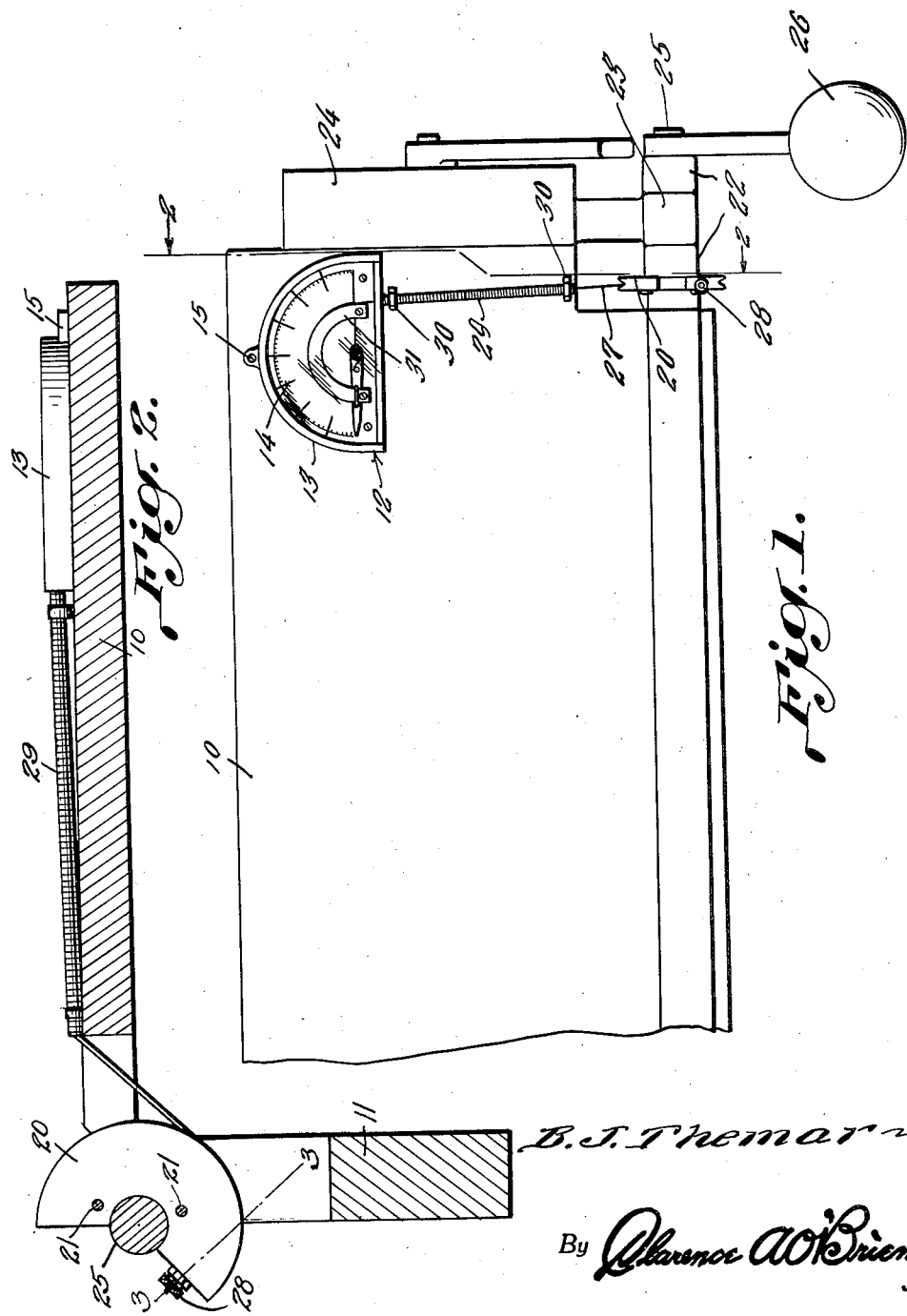
Inventor
B. J. Themar
By Clarence A. O'Brien,
Attorney Sept. 17, 1935. B. J. THEMAR 2,014,485
ANGLE INDICATOR FOR CORNICE BRAKES
Filed July 6, 1934 2 Sheets-Sheet 2
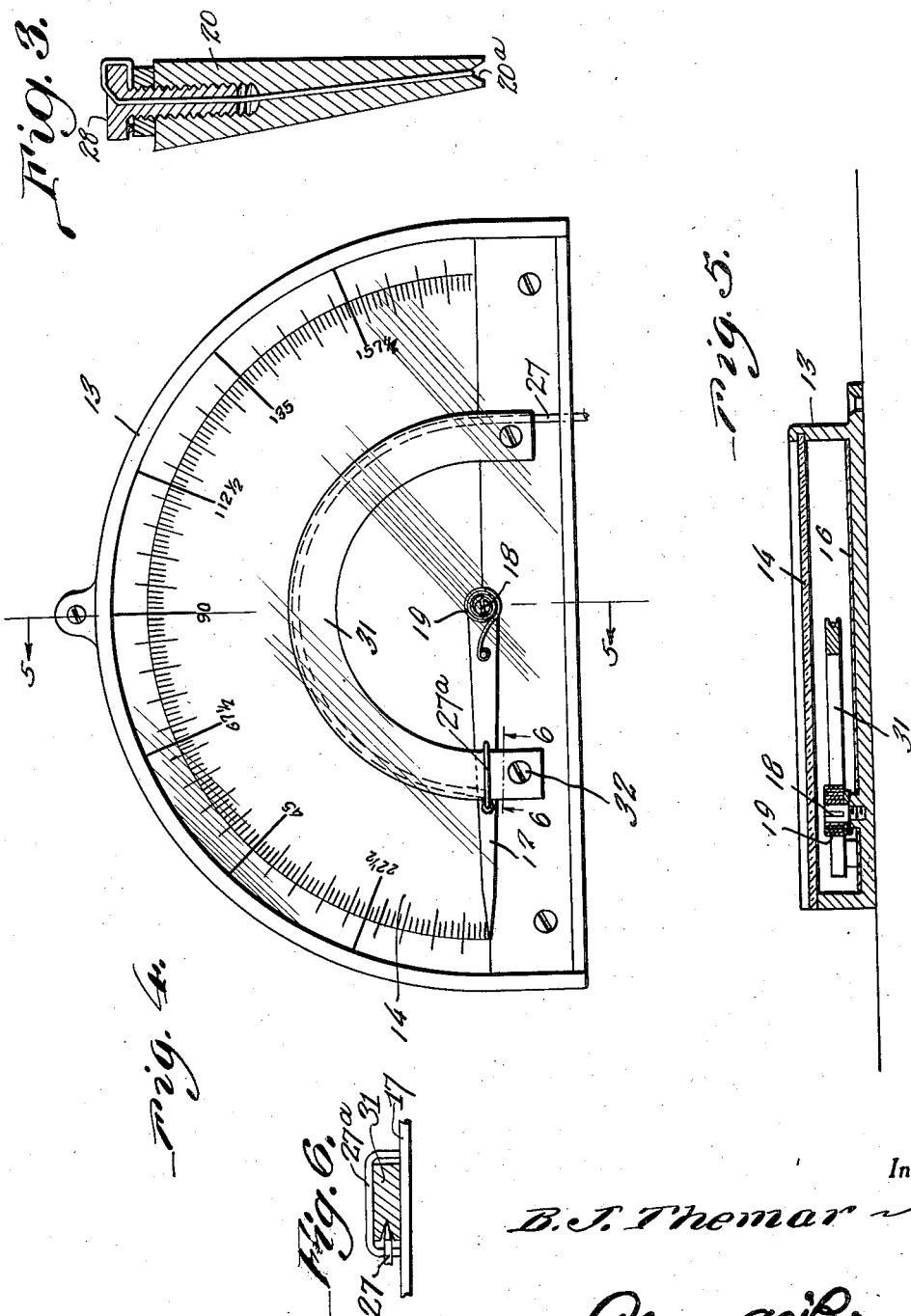
Inventor
B. J. Themar
By Clarence A. O'Brien
Attorney Patented Sept. 17, 1935

2,014,485

UNITED STATES PATENT OFFICE 2,014,485

ANGLE INDICATOR FOR CORNICE BRAKES

Benjamin J. Themar, Hastings, Nebr.

Application July 6, 1934, Serial No. 734,055

5 Claims. (Cl. 153—16)

This invention has reference to a device primarily intended for use with a cornice brake to enable the tinsmith to ascertain accurately and at a glance the angle or degree to which a piece of sheet steel is being bent in the forming of a cornice from the sheet.

An object of the invention is to provide a device of this character which may be readily applied to any and all makes of cornice brakes now in use and which is itself simple and economical in construction and practical and efficient in operation.

The invention together with its objects and advantages will be best understood from a study of the following description taken in connection with the accompanying drawings wherein:

Figure 1 is a top plan view illustrating an application of the invention.

Figure 2 is a sectional view taken substantially on the line 2—2 of Figure 1.

Figure 3 is a detail section taken substantially on the line 3—3 of Figure 2.

Figure 4 is a plan view of the gage forming part of the indicator.

Figure 5 is a sectional view taken substantially on the line 5—5 of Figure 4.

Figure 6 is a detail view taken substantially on the line 5—5 of Figure 4.

Referring more in detail to the drawings, it will be seen that the numeral 10 indicates the face plate of a conventional cornice brake and between which plate and the bench the sheet of steel which is to be bent in the forming of the cornice is clamped. For cooperation with the plate 10 is the usual apron 11 which is mounted to swing upwardly in a clockwise direction relative to the plate 10 for bending the sheet to the desired angle.

In accordance with the present invention, there is provided a gage that is adapted to operate in conjunction with the apron 11 for indicating the angle formed in the making of the cornice. The gage in the preferred embodiment thereof comprises a gage proper indicated generally by the reference numeral 12. The gage proper comprises a casing 13 preferably of the shape shown and provided in the top thereof with a window 14. At the base thereof, the housing or casing 13 is provided with a suitable flange apertured so as to accommodate a fastening element 15 whereby the casing is secured to the base plate 10.

Arranged within the casing and resting on the bottom thereof is a protractor dial 16 having an arcuate scale graduated in terms of degrees.

A pointer 17 is movable over the face of the dial 16 and at one end is pivoted to rotate about the stud 18 as an axis. The stud 18 is threaded into a suitable boss provided therefor in the bottom of the casing 13 as shown in Figure 5. Disposed about the boss and anchored at one end thereto is a coil spring 19 one end of which is also anchored to the pointer or index 17 in a manner normally to urge the index to the zero position shown in the drawings.

At corresponding ends thereof the base plate 10 and apron 11 of the cornice brake are suitably notched to accommodate a segment or segmental pulley 20. The pulley 20 is suitably secured by fastening means 21 to one of a pair of ears 22 provided at the upper edge of the apron 11 at the notched end of the apron. These apertured ears 22 straddle an arm 23 projecting forwardly from a block 24 provided at the notched end of the base plate 10. The arm 23 supports a pivot stud 25 and with this stud are engaged the aforementioned ears 22. On the end of the stud 25 remote from the segmental pulley 20 is an operating handle or crank 26.

For operatively connecting the index or pointer 17 with the pulley 20 there is provided a suitable length of piano wire or the like 27 which has one end portion operating in a groove 20a provided in the edge or periphery of the pulley 20 and at one end anchored to the pulley through the medium of an anchoring screw 28 threaded into a socket suitably provided in the pulley at one of the straight angularly related edges of the pulley. The wire 27 which operates through a flexible metallic tube 29 suitably secured to the base plate 10 by clamps 30 has its other end trained or operating in a groove provided in one edge of a substantially U-shaped guide or track 31 the ends of which are spaced an equal distance from the pivot or stud 18 and are secured within the casing 13 by suitable fastening means 32. The last named end of the wire 27 is secured to a loop 27a straddling the track 31 and then engaged with the pointer or index 17 in a manner clearly shown in Figure 6.

From the above it will be apparent that when the arm 26 is swung upwardly to swing the apron 11 of the brake in a corresponding direction for forming the angle in the construction of the cornice, pulley 20 will rotate therewith for winding the wire 27 thereon. Such will result in a pull on the wire 27 in a manner to cause the pointer 17 to sweep over the dial 16, and obviously by reading the pointer against the graduations of the dial, the angle formed in the making of the cornice can be readily ascertained.

Upon movement of the parts of the brake to the normal position, spring 19 will tend to return the pointer 17 to its normal or zero-indicating position.

What is claimed is:

1. In combination with the base plate and apron of a cornice brake, and a pivot pin for the apron, a protractor dial mounted on the base plate, a pulley mounted on said pivot for rotation with the apron of the brake, a pivoted pointed arranged to sweep over the graduations on the dial, and a member windable on the pulley and secured at one end thereto, and at an opposite end to the pointer for moving the pointer in consonance with the swinging of the apron for indicating the angle being formed in the cornice.

2. A gage of the character described comprising a casing, a dial mounted in the casing, a pointer pivotally mounted in the casing and arranged to sweep over the face of the dial, a substantially U-shaped track secured within the casing, concentric to the pivot of the pointer, and a flexible operating element for the pointer connected at one end with the pointer and having a portion operating within the groove of the track and a second portion embracing the track for guiding the pointer, and means connected with the flexible element for operating the pointer through said element.

3. A gage of the character described comprising a casing, a dial mounted in the casing, a pointer pivotally mounted in the casing and arranged to sweep over the face of the dial, a substantially U-shaped track secured within the casing, concentric to the pivot of the pointer, and a flexible operating element for the pointer connected at one end with the pointer and having a portion operating within the groove of the track and a second portion embracing the track for guiding the pointer, means connected with the flexible element for operating the pointer through said element, and a spring device connected with the pointer and yieldably retaining the latter in zero-indicating position.

4. An angle gage for cornice brakes comprising a gage proper including a scale, a pivoted pointer mounted to move over the scale, a track disposed substantially concentric to the pivot of the pointer, a flexible operating element for the pointer connected therewith and having a portion operating within and guided by the track, and a pulley adapted to be associated with the apron of the cornice brake for movement therewith, and said flexible element being windable on the pulley and secured thereto for moving the pointer in consonance with the swinging of the apron for indicating the angle being formed in the cornice.

5. In a gage of the character described, a dial, a pointer pivotally mounted and arranged to sweep over the face of the dial, a track disposed concentric to the pivot of the pointer, and a flexible operating element for the pointer connected at one end with the pointer and having a portion operating within the groove of the track and a second portion embracing the track for guiding the pointer.

BENJAMIN J. THEMAR.